C. ALLEN.
THICKENER (SEWAGE TYPE).
APPLICATION FILED MAR. 11, 1920.

1,374,134.

Patented Apr. 5, 1921.

INVENTOR
Charles Allen
BY Chas. E. Townsend
ATTORNEY

UNITED STATES PATENT OFFICE.

CHARLES ALLEN, OF EL PASO, TEXAS.

THICKENER, (SEWAGE TYPE.)

1,374,134.     Specification of Letters Patent.     Patented Apr. 5, 1921.

Application filed March 11, 1920. Serial No. 365,081.

*To all whom it may concern:*

Be it known that I, CHARLES ALLEN, a citizen of the United States, residing at El Paso, in the county of El Paso and State of Texas, have invented a new and useful Improvement in Thickeners, (Sewage Type,) of which the following is a specification.

This invention relates to devices by which fluids and all suspensions composed of substances that segregate by gravity are separated or thickened and the thickened product discharged as a pulp of predetermined density. The present device is designed for use in sewage disposal plants, sugar plants, pulp mills, and the treatment of products from chemical and metallurgical plants where a discharge of uniform density is required.

The object of the invention is to control the discharge of the thickened material in an improved and simplified manner. The device comprises a tank into which the material to be treated is continuously fed, the liquid and slowly settling solids overflowing the rim and the remainder settling to the bottom of the tank. Communicating with the bottom of the tank and extending to a point near the top thereof is a discharge pipe for the thickened material whereby to permit discharge at a point near the top of the tank so that the tank may be countersunk. The discharge pipe is fitted with a valve and said valve is operated by a float which float is positioned in the bottom portion of the tank where the settled material accumulates. Normally, the float is depressed to maintain the valve closed, but when the settled material reaches a predetermined density, said float rises and causes the valve to be opened, whereupon the settled or thickened material will be carried off through the discharge pipe. The degree of density of the discharged product can be accurately controlled by regulating the buoyancy of the float.

In sewage disposal plants, the present practice is to provide the discharge pipe with a hand operated valve or gate and therefore every change either in the density or volume of the feed stream must be compensated for by a manual adjustment of the valve if the discharge is to be kept anywhere near a uniform density. By providing the float and associated mechanism for operating the valve in the present case, the adjustment of the valve is accomplished automatically and a discharge of constant density is insured.

Figure 1:
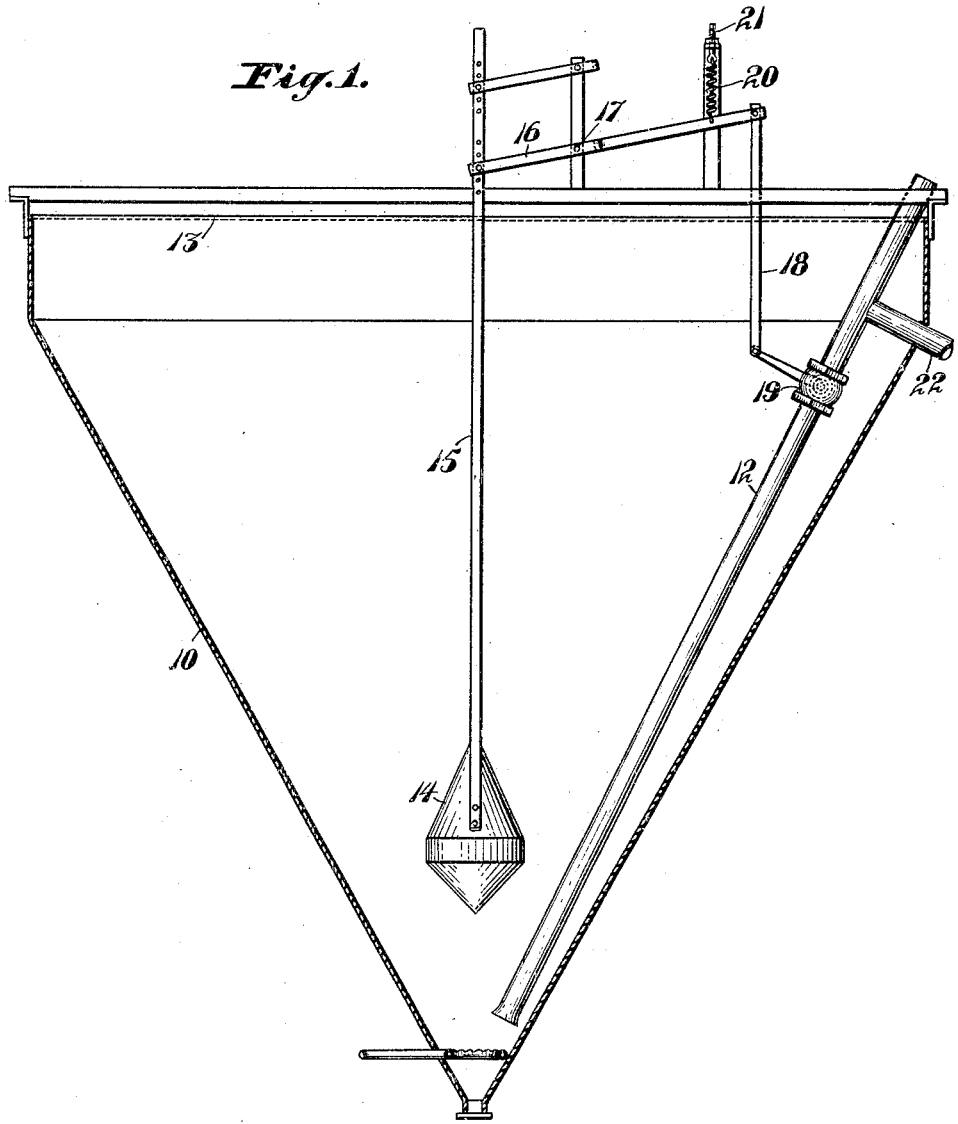
Figure 1 shows a vertical central sectional view of one form of the device embodying my invention.
Figure 2:
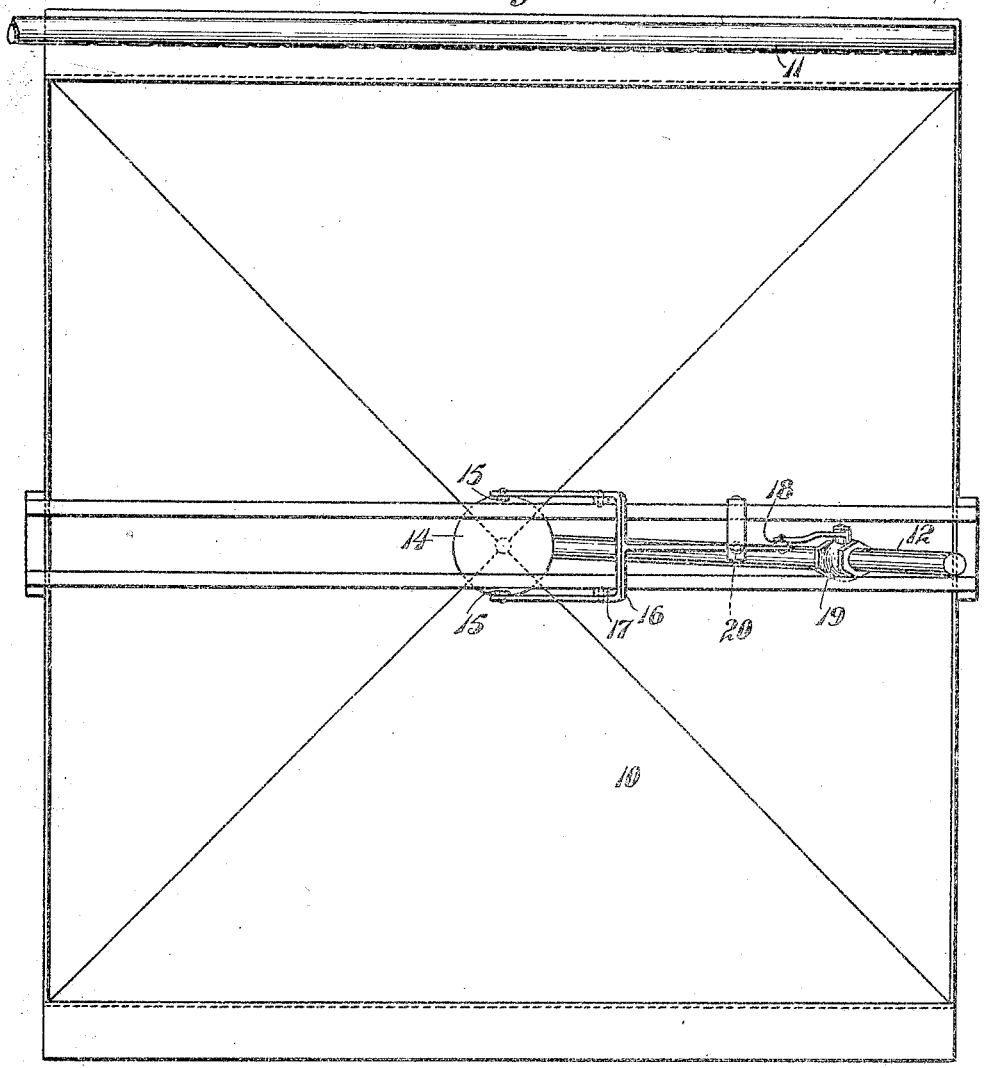
Fig. 2 shows a plan view of the same.

Referring in detail to the accompanying drawings, I show a vessel or tank 10 formed with inclined side walls converging at the bottom. A feed pipe 11 conveys material to the vessel and a discharge pipe 12 extending downwardly within the tank to a point near the bottom thereof is provided for carrying off the settled or thickened material. The feed to the vessel is constant and the liquid and slowly settling particles overflow the rim 13 of the tank while heavier or more quickly settling particles accumulate in the bottom of the vessel where I have arranged a float or buoyant member 14. This float is preferably cone-shaped and has a stem 15 extending upwardly and connecting with a lever 16 mounted on a frame 17 at the top of the tank. The opposite end of the lever 16 connects with the link 18 which latter in turn connects with and operates a valve 19 in the discharge pipe 12. A spring 20 having an adjusting screw 21 is provided to opposed upward movement of the float. The discharge pipe 12 is provided with a discharge spout 22 near its upper end extending outwardly through the side wall of the vessel.

In the operation of the device, the float is normally depressed by reason of its weight and the pressure of the spring 20 and in this depressed position it maintains the valve 19 closed. When, however, the material in the bottom of the tank reaches a predetermined density, the float will be raised and cause the valve to be opened, whereupon the settled material in the bottom of the tank will pass out through the discharge pipe 12. The contents of the vessel 10 is the head effective to raise the material in the discharge pipe, and even where the last named material is heavier than that contained in the tank, the discharging will take place by reason of the fact that the height of the tank is greater than the height of the discharge pipe.

Figure 3:
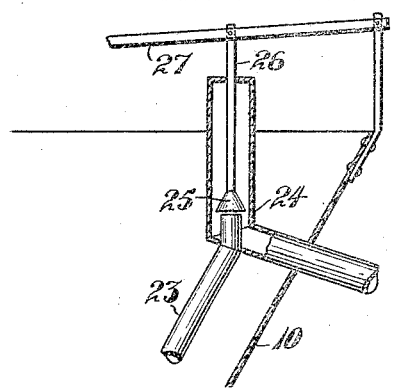
Fig. 3 shows a modified arrangement of the discharge pipe and valve for controlling the operation of the same.

As a modification, I show in Fig. 3 a discharge pipe 23 having an open end disposed near the top of the tank and surrounded by an elbow 24, one arm of which elbow extends above the top of the tank and the other arm passes outwardly through the side wall of the tank and forms the discharge nozzle. A valve 25 seats on top of the pipe 23 and is connected by a link 26 with a lever 27 similar to the lever 16.

In a prior application filed by me, Serial No. 312,601, I show and describe a discharge pipe somewhat similar to the present one, but the volume discharged therethrough is controlled by varying the quantity of the segregated material entering the pipe. The pipe in said prior application is of uniform cross-section throughout and no means is shown by which the cross-sectional area of the pipe can be controlled. Also the discharge pipe in said prior application passes over the overflow lip of the tank instead of through the side wall as is here disclosed. By the present device, I am enabled to maintain constant the density of the discharged material by automatically controlling the volume flowing through the discharge pipe by restricting the area available for its passage through the pipe or the area of the discharge opening of the pipe. By providing the valve in the discharge pipe, I am enabled to prevent any discharge through the pipe before the tank is full to the level of its overflow lip.

Various changes in the construction and arrangement of the several parts may be employed without departing from the spirit of my invention as disclosed in the appended claims.

Having thus described my invention, what I claim and desire to secure by Letters Patent is:

1. In a device of the character described, a vessel having an overflow rim to permit liquid and slowly settling solids to overflow while allowing the remainder of the material to accumulate in the bottom of the vessel, a discharge pipe for the accumulated material in the bottom of the vessel extending upwardly to a point near the top of the vessel, means for controlling the area of the passageway through the pipe, and means automatically responsive to variations in the density of the accumulated material in the bottom of the vessel to actuate said controlling means whereby to maintain the discharge through the pipe at an approximately constant density.

2. In a device of the character described, a vessel having an overflow rim to permit liquid and slowly settling solids to overflow while allowing the remainder of the material to accumulate at the bottom of the vessel, a discharge pipe for the accumulated material in the bottom of the tank extending upwardly to a point near the top of the vessel, a valve in said discharge pipe, a float arranged within the vessel where the settled material accumulates, operative connections between said float and valve, and means to control the movement of the float whereby it will remain depressed and maintain the valve closed until such time as the accumulated material reaches a predetermined density whereupon it will rise to open the valve.

3. A device as set forth in claim 2, having the discharge pipe arranged within the vessel and provided with a discharge nozzle extending outwardly through the side wall of the vessel below the overflow rim thereof, and an arm extending above the surface of the contents of the vessel.

4. In a device of the character described, a vessel having an overflow rim to permit liquid and slowly settling solids to overflow while allowing the remainder of the material to accumulate in the bottom of the vessel, a discharge pipe for the accumulated material in the bottom of the vessel extending upwardly to a point near the top of the vessel, means for controlling the discharge from the pipe, and means automatically responsive to variations in the density of the accumulated material in the bottom of the vessel to actuate said controlling means whereby to maintain the discharge through the pipe at an approximately constant density.

In testimony whereof I have hereunto set my hand in the presence of two subscribing witnesses.

CHARLES ALLEN.

Witnesses:
 EDMUND SHAW,
 ARTHUR H. SWETT.